(12) United States Patent
Älveby

(10) Patent No.: US 8,820,263 B2
(45) Date of Patent: *Sep. 2, 2014

(54) TEATCUP LINER

(71) Applicant: DeLaval Holding AB, Tumba (SE)

(72) Inventor: Nils Älveby, Bandhagen (SE)

(73) Assignee: DeLaval Holding AB, Tumba (SE)

(\*) Notice: Subject to any disclaimer, the term of this patent is extended or adjusted under 35 U.S.C. 154(b) by 0 days.

This patent is subject to a terminal disclaimer.

(21) Appl. No.: 14/028,820

(22) Filed: Sep. 17, 2013

(65) Prior Publication Data

US 2014/0014041 A1  Jan. 16, 2014

Related U.S. Application Data

(63) Continuation of application No. 13/465,527, filed on May 7, 2012, now Pat. No. 8,567,346.

(51) Int. Cl.
*A01J 5/04* (2006.01)
*A01J 5/16* (2006.01)
*A01J 5/08* (2006.01)

(52) U.S. Cl.
CPC ..... *A01J 5/16* (2013.01); *A01J 5/08* (2013.01)
USPC ...................................... 119/14.49

(58) Field of Classification Search
USPC ............................................ 47/14.47, 14.49
See application file for complete search history.

(56) References Cited

U.S. PATENT DOCUMENTS

| 1,312,941 | A | 8/1919 | Anderson |
|---|---|---|---|
| 1,365,665 | A | 1/1921 | Davies |
| 4,530,307 | A | 7/1985 | Thompson |
| 5,224,442 | A | 7/1993 | Davies |
| 6,164,243 | A | 12/2000 | Larson |
| 6,776,120 | B1 | 8/2004 | Chowdhury |
| 2011/0126768 | A1 | 6/2011 | Grace et al. |

FOREIGN PATENT DOCUMENTS

| EP | 0457993 | 11/1991 |
|---|---|---|
| EP | 0 958 738 | 11/1999 |
| FR | 499 796 | 2/1920 |
| FR | 953 779 | 12/1946 |
| GB | 191010690 | 7/1911 |
| WO | 04000002 | 12/2003 |
| WO | 2009/042022 | 4/2009 |

OTHER PUBLICATIONS

International Search Report, dated Nov. 21, 2012, from corresponding PCT application No. ITS/SE12/00105.
International Search Report, dated Aug. 1, 2013, from corresponding PCT Application No. PCT/SE2013/050500.

*Primary Examiner* — Monica Williams
(74) *Attorney, Agent, or Firm* — Young & Thompson

(57) ABSTRACT

A teatcup liner for a teatcup has a longitudinal shape extending along a longitudinal axis (x). The teatcup liner includes a barrel (2) having a length (L) and defining an inner space (21) for receiving the teat. The barrel has a polygonal cross-sectional shape transversely to the longitudinal axis along the barrel. The polygonal cross-sectional shape defines a plurality of corner portions and a plurality of side portions, each connecting two of the corner portions. Each corner portion includes an inner surface facing the inner space and having an inner radius extending from the inner space to the inner surface. The inner radius is equal for each corner portion. Furthermore, the inner radius of each of the corner portions is at least 4 mm at a centre part of the corner portion.

20 Claims, 5 Drawing Sheets

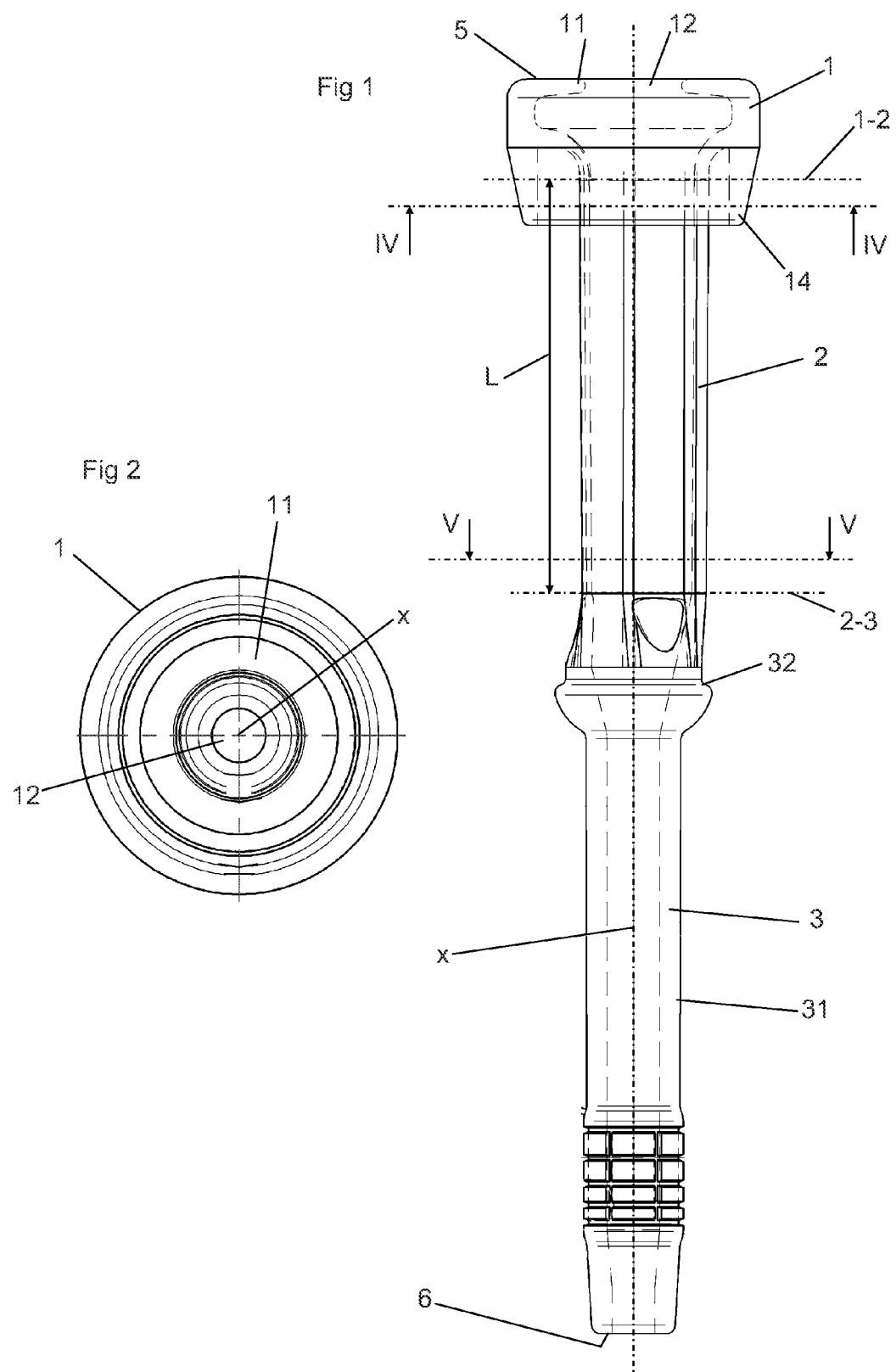

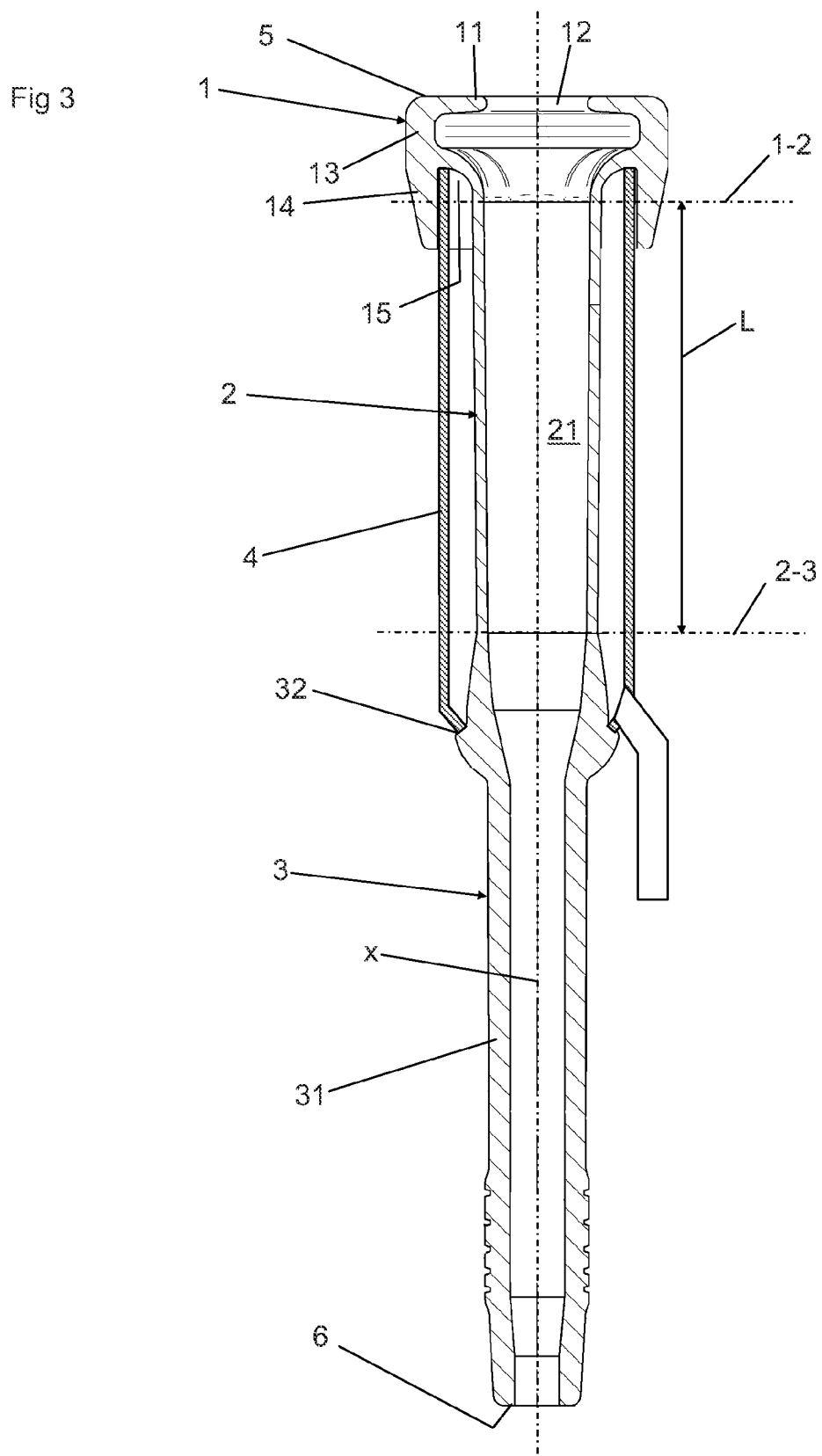

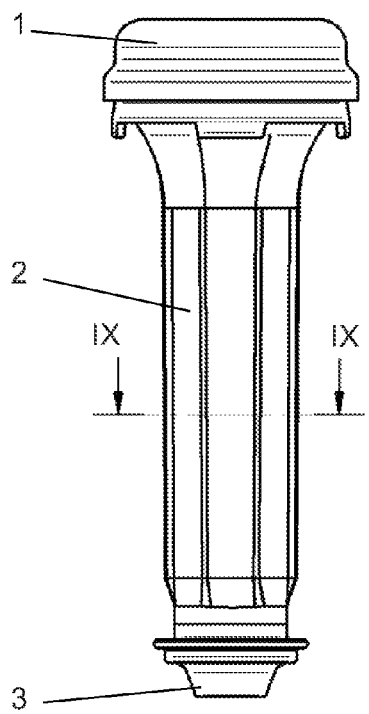
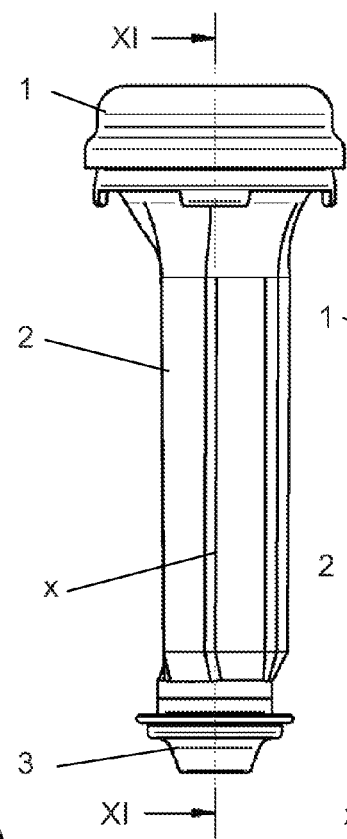
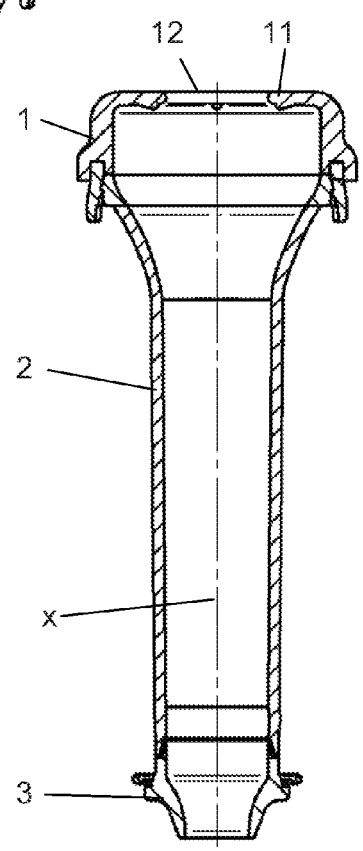
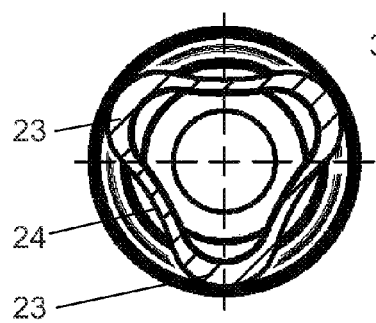
Fig 8
Fig 10
Fig 11
Fig 9

TEATCUP LINER

TECHNICAL FIELD OF THE INVENTION

The present invention refers to a teatcup liner configured to be mounted in a shell of a teatcup to be applied to a teat of an animal according to the preamble of claim 1.

BACKGROUND OF THE INVENTION AND PRIOR ART

Teatcup liners having a barrel with various cross-sectional shapes are known. A barrel with a circular cross-sectional shape is common and have an advantage of a fast and complete milking.

U.S. Pat. No. 6,164,243 discloses a teatcup liner comprising a head end portion, a barrel, and an outlet tube. The barrel has a triangular shape with three corner portions and three side portions extending along the length of the barrel. Each of the side portions is curved or bulged outwardly in a rest state.

FR-953,779 discloses another teatcup comprising a shell and a teatcup liner, both having a triangular cross-section with outwardly curved or bulged side portions in a rest state.

Teatcup liners having a barrel with a triangular cross-sectional shape are advantageous in the sense that they are considered to result in a gentle teat treatment during the milking operation. A disadvantage of such triangular or polygonal teatcup liners is, however, that they do not shut off the vacuum completely, resulting in a slower milking.

WO 2009/042022 discloses a teatcup liner having a barrel with a square cross-section.

EP-958 738 discloses a teatcup liner having a barrel with a wave-shape cross-section.

SUMMARY OF THE INVENTION

The object of the present invention is to overcome the problems discussed above and to provide a teatcup liner providing an efficient milking and securing a gentle treatment of the teat during the milking operation.

This object is achieved by the teatcup liner initially defined, which is characterised in that the inner radius is equal for each corner portion and that the inner radius of each of the corner portions in the rest state is at least 4 mm at a centre part of the corner portion.

Teatcup liners with for instance a triangular cross-sectional shape of the barrel, whereby the shape is approaching a perfect triangle, will have relatively acute corners towards the inner space. However, the teat is not capable of being deformed to such an extent that these corners are filled by the teat, but there will remain an empty space between the teat and the inner surface of the teatcup liner during the entire milking also when the teatcup liner is collapsed.

The inventor of the present invention has realised this problem and has arrived at the understanding that this problem may be solved by providing the inner surface of the corner portions with a relatively large radius at a centre part of the corner portion, especially at least 4 mm. The teatcup liner according to the present invention will thus permit the teat to fill up the inner space of the teatcup liner during the whole pulsating cycles of the milking operation and to have a good contact with the teatcup liner. Consequently, the teatcup liner of the present invention ensures a proper and efficient milking performance.

In addition, the polygonal cross-sectional shape will result in low strains and pressures against the teat in the region close to the teat end or teat tip, and thus to a gentle treatment of the teat.

For the interpretation of the claims, it is to be noted that the rest state may refer to the state when the teatcup liner is not mounted in the shell of the teatcup and thus not subjected to any external forces at all. However, the rest state may also refer to the state when the teatcup liner is mounted in the shell of the teatcup, and not subjected to any further external forces other than from the tensioning resulting from the mounting of the teatcup liner in the shell of the teatcup. In any case, the teatcup liner is not subjected to for instance a milking vacuum or a pulsating vacuum in the rest state, or to the forces or pressures arising when the teat is introduced into the inner space of the teatcup liner.

According to an embodiment of the invention, the inner radius of each of the corner portions is at least 5 mm at the centre part of the corner portion.

According to a further embodiment of the invention, each of the side portions is in the rest state curved inwardly towards the longitudinal axis. Such an inwardly directed curvature or bulging contributes to a uniform collapsing of the teatcup liner, and ensures that all side portions of the barrel of the teatcup liner collapse properly. Advantageously, each of the side portions may in the rest state be curved inwardly towards the longitudinal axis along the length of the barrel.

According to a further embodiment of the invention, each side portion comprises an inner surface facing the inner space and having an inner radius extending from a position outside the inner space to the inner surface, wherein the inner radius of each of the side portions is in the rest state at least 20 mm and at the most 100 mm at a centre part of the side portion. Advantageously, the inner radius of each of the side portions may in the rest state be at least 30 mm and at the most 50 mm at the centre part of the side portion.

According to a further embodiment of the invention, a border line between the corner portion and the side portion is located at an inner transition point, at which a tangent of the inner surface of the corner portion and a tangent of the inner surface of the side portion are parallel and coincide with each other. In such a way a smooth transition between the inner surface of the corner portion and the inner surface of the side portion is ensured.

According to a further embodiment of the invention, each corner portion comprises an outer surface facing away from the inner space and having an outer radius extending from the inner space to the outer surface, wherein each side portion comprises an outer surface facing away from the inner space and having an outer radius extending from a position outside the inner space to the outer surface, and wherein a border line between the corner portion and the side portion is located at an outer transition point, at which a tangent of the outer surface of the corner portion and a tangent of the outer surface of the side portion are parallel and coincide with each other. In such a way a smooth transition between the outer surface of the corner portion and the outer surface of the side portion is ensured.

According to a further embodiment of the invention, each of the side portions has a first wall thickness at least at a centre part of the side portion along the length of the barrel, and each of the corner portions has a second wall thickness at least at the centre part of the corner portion along the length of the barrel, wherein the first wall thickness is smaller than the second wall thickness. Such a difference in the wall thickness between the side portion and the corner portion also contribute to a proper collapsing of each of the side portions. Advantageously, the ratio of the first wall thickness to the second wall thickness may lie in the range 0.3 to 0.7. Especially, the ratio of the first wall thickness to the second wall thickness may be 0.5, or approximately 0.5.

Preferably, the first wall thickness of the side portions may be 1 to 2.6 mm, and the second wall thickness of the corner portions may be 2.3 to 6 mm.

According to a further embodiment of the invention, the barrel is tapering along the length from the head to the outlet portion. In spite of the tapering of the barrel, the inner radius is within the limits defined above for the centre part of the corner portions along the whole length of the barrel.

According to a further embodiment of the invention, the polygonal cross-sectional shape defines at least three and at the most four corner portions, and thus at least three and at the most four side portions. The barrel thus has an approximately triangular or approximately square cross-sectional shape.

According to a further embodiment of the invention, the barrel, in the rest state, has an approximately triangular, or triangular, cross-sectional shape transversely to the longitudinal axis along the length from the head to the outlet portion, the cross-sectional shape thereby defining three corner portions and three side portions each connecting two of said corner portions.

According to a further embodiment of the invention, the teatcup liner also comprises, along the longitudinal axis, a head comprising a lip and an opening for the teat, and an outlet portion, and wherein the barrel extends along the length from the head to the outlet portion.

According to a further embodiment of the invention, the head is an integrated part of the teatcup liner. According to another embodiment of the invention, the head is a separate part attached to the barrel to form the teatcup liner.

According to a further embodiment of the invention, the outlet portion forms a short milk conduit. According to another embodiment of the invention, the outlet portion comprises a nipple configured to permit connection of the outlet portion to a separate short milk conduit.

BRIEF DESCRIPTION OF THE DRAWINGS

The present invention will now be explained more closely by means of a description of various embodiments and with reference to the drawings attached hereto.

FIG. 1 discloses a longitudinal side view of a first embodiment of a teatcup liner according to the invention.

FIG. 2 discloses a view from above of the teatcup liner in FIG. 1.

FIG. 3 discloses a longitudinal sectional view of a shell and the teatcup liner in FIG. 1.

FIG. 8 discloses a longitudinal side view of a third embodiment of a teatcup liner according to the invention.

FIG. 9 discloses a sectional view of the teatcup liner along the line IX-IX in FIG. 8.

FIG. 10 discloses a another longitudinal side view of the third embodiment of the teatcup liner in FIG. 8.

FIG. 11 discloses a sectional view of the teatcup liner along the line XI-XI in FIG. 10.

DETAILED DESCRIPTION OF VARIOUS EMBODIMENTS OF THE INVENTION

Figure 4:
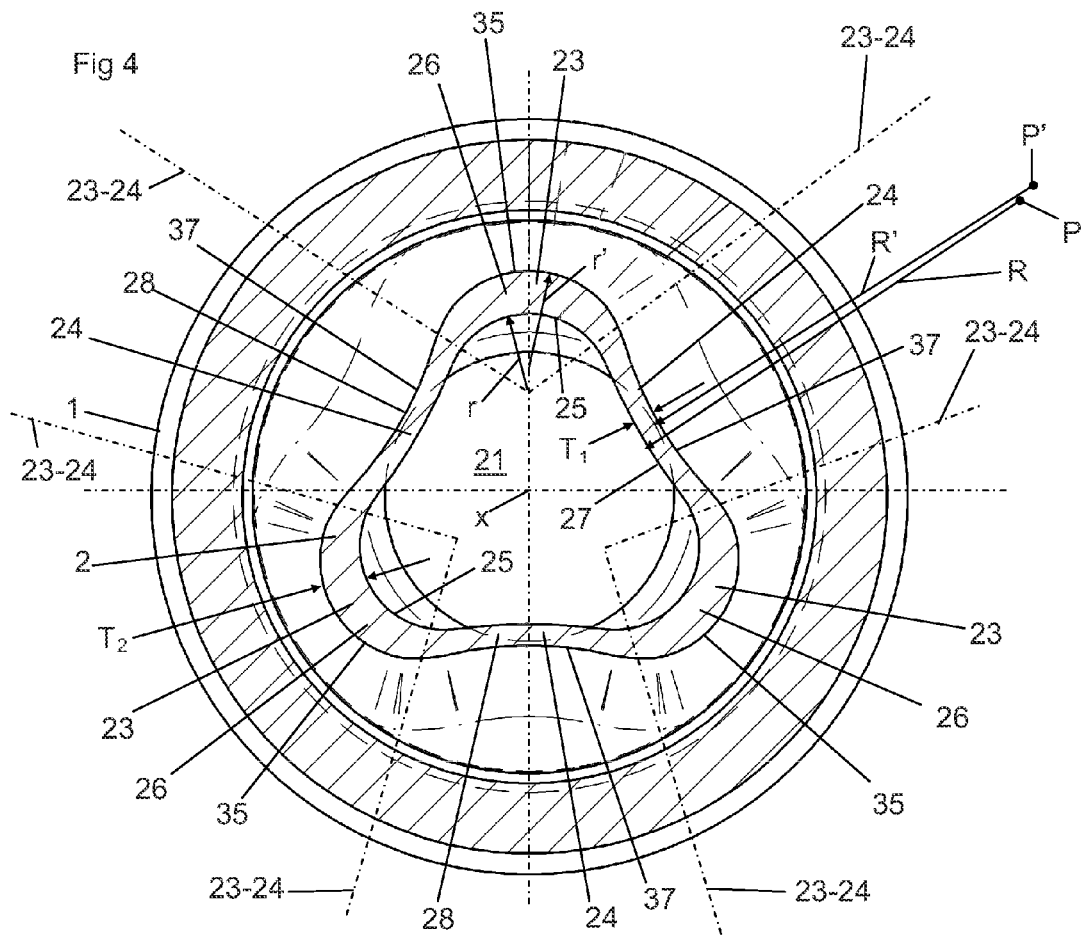
FIG. 4 discloses a sectional view of the teatcup liner along the line IV-IV in FIG. 1.

FIGS. 1 and 2 disclose a teatcup liner comprising a head 1, a barrel 2 and an outlet portion 3. As can be seen in FIG. 3, the teatcup liner is configured to be mounted in a shell 4 of a teatcup, i.e. the teacup liner and the shell 4 may form the teatcup, to be applied to a teat of an animal.

The teatcup liner has a longitudinal shape and extends along a longitudinal axis x. The head 1, the barrel 2 and the outlet portion 3 are provided subsequently after each other along the longitudinal axis x. In the first and second embodiments, the head 1, the barrel 2 and the outlet end 3 are manufactured in one piece of one elastomeric material, such as natural or synthetic rubber, thermo-plastic elastomers, etc. It is to be noted that the head 1 and/or the outlet portion 3 may be manufactured in another, possibly less elastomeric material than the barrel 2.

The border between the head 1 and the barrel 2 is indicated by the line 1-2 in FIGS. 1 and 2. The border between the barrel 2 and the outlet portion 3 is indicated by the line 2-3 in FIGS. 1 and 2.

The head 1 forms a first end 5 of the teatcup liner. The first end 5 forms an upper end of the teatcup liner to be applied against the udder of the animal during milking.

The head 1 comprises a lip 11 forming an opening 12 for the teat. Furthermore, the head 1 comprises an annular base 13 from which the lip 11 extends towards the longitudinal axis x. The annular base 13 extends from the first end 5 to the barrel 2, i.e. to the border line 1-2.

The head 1 may also comprise a collar 14 which extends from the annular base 13 towards the outlet portion 3, and forms an annular recess 15 for receiving a first end of the shell 4.

The barrel 2 has a length L and defines an inner space 21 for receiving the teat. The barrel 2 extends along the longitudinal axis x from the head 1, i.e. the annular base 13 of the head 1, to the outlet portion 3. The length L of the barrel 2 is significantly larger than the length of the head 1 along the longitudinal axis x.

The barrel 2 is in the embodiments disclosed tapering, or slightly tapering, along the length L from the head 1 to the outlet portion 3. However, it is to be noted that the barrel 2 also may have a cylindrical shape, i.e. without any taper.

The outlet portion 3 thus extends from the barrel 2 to a second end 6 of the teatcup liner. In the first and second embodiments, the outlet portion 3 comprises a short milk conduit 31 extending to the second end 6 and being configured to be attached to a claw or any other similar milk-receiving member (not disclosed). It is to be noted that the outlet portion 3 may be shorter than disclosed, i.e. the short milk conduit 31 is replaced by an outlet member, such as a nipple or the like, to be attached to a separate short milk conduit.

The outlet portion 3 also comprises means, such as a shoulder 32, a groove or a recess, to engage a second end of the shell 4 when the teatcup liner is mounted in the shell 4 to form the teatcup.

The teatcup liner is disclosed in a rest state, or a mounted rest state, in FIG. 2. As mentioned above, the rest state may refer to the state when the teatcup liner is mounted in the shell 4, but not subjected to any further external forces other than from the tensioning resulting from the mounting of the teatcup liner in the shell of the teatcup, i.e. the teatcup liner is not subjected to a milking vacuum or a pulsating vacuum, or to the forces or pressures arising when the teat is introduced into the inner space 21.

Figure 5:
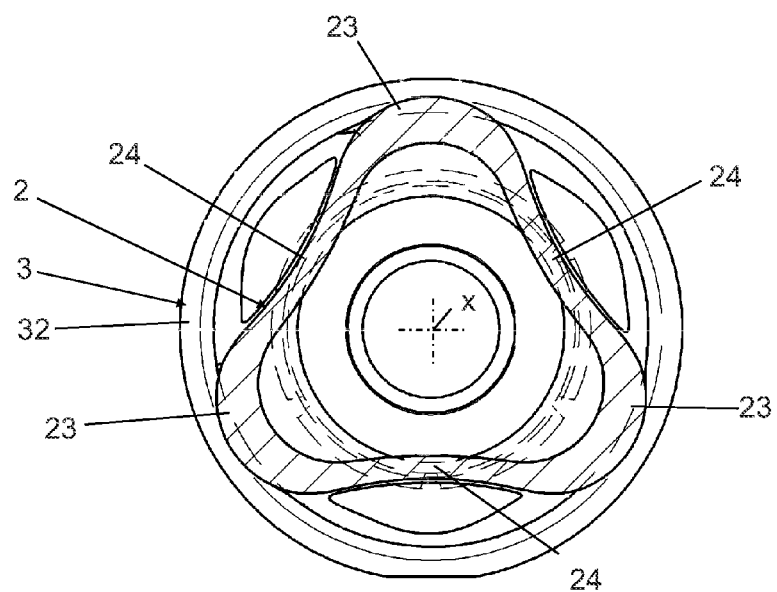
FIG. 5 discloses a sectional view of the teatcup liner along the line V-V in FIG. 1.

As can be seen in FIGS. 4 and 5, the barrel 2 has, in the rest state, a polygonal cross-sectional shape with three corners, or a triangular, or an approximately triangular, cross-sectional shape, seen transversely to the longitudinal axis x, preferably along the whole, or substantially the whole, length L from the head 1 to the outlet portion 3. The triangular cross-sectional shape defines three corner portions 23 and three side portions 24. Each side portion 24 connects two of the corner portions 24. The borders between the corner portions 23 and the side portions 24 are indicated by the border lines 23-24 in FIG. 4, i.e. the corner portions 23 and the side portions 24 are separated from each other by a border line 23-24.

Each corner portion 23 comprises an inner surface 25 facing the inner space 21 and having a concave curvature towards the inner space 21 with an inner radius r extending from the inner space 21 to the inner surface 25. The inner radius r of the corner portions 23 is relatively long, especially in comparison with the inner radius of the corner portion of a perfectly triangular shape.

In the embodiments disclosed, the inner radius r is equal for each corner portion 23. Moreover, the inner radius r of each of the corner portions 23 is in the rest state at least 4 mm at at least a centre part 26 of the corner portion 23. More specifically, the inner radius r of each of the corner portions 23 may be at least 5 mm at at least the centre part 26 of the corner portion 23, possibly along the whole corner portions 23. It is to be noted that these limits for the inner radius r are valid for the inner surface 25 of the corner portions 23 along the whole length L, or substantially the whole length L, of the barrel 2.

As also can be seen in FIGS. 4 and 5, each of the side portions 24 of the barrel 2 is in the rest state curved inwardly towards the longitudinal axis x, preferably along the whole length L, or substantially the whole length L, of the barrel 2. Each side portion 24 comprises an inner surface 27 facing the inner space 21 and having a convex curvature towards the inner space 21 with an inner radius R extending from a position P outside the inner space 21 to the inner surface 27. The inner radius R of each of the side portions 24 is larger than, or significantly larger than, the inner radius r of the corner portions 23.

The inner radius R of each of the side portions 24 is in the rest state at least 20 mm and at the most 60 mm at at least a centre part 28 of the side portion, or possibly at the whole side portions 24, preferably at least 30 mm and at the most 50 mm, more preferably at least 35 mm and at the most 45 mm. Especially, the inner radius R of each of the side portions 24 may be approximately 40 mm. It is to be noted that these limits for the inner radius R of each of the side portions 24 are valid for the inner surface 27 of the side portions 24 along the whole length L, or substantially the whole length L, of the barrel 2.

The border line 23-24 between the corner portion 23 and the side portion 24 is located at an inner transition point in a cross-sectional plane, or inner transition line along the length L, at the inner surfaces 25, 27, where the inner radius r of the corner portion 23 is transferred to the inner radius R of the side portion 24. As can be seen in FIGS. 4 and 5, there is no discontinuity at this inner transition point, where the border line 23-24 intersects the inner surfaces 25, 27. In other words, a tangent of the inner surface 25 of the corner portion 23, in said cross-sectional plane, and the tangent of the inner surface 27 of the side portion 24, in said cross sectional plane, are parallel and coincide with each other at the inner transition point.

Moreover, each corner portion 23 comprises an outer surface 35 facing outwardly, away from the inner space 21 and having a convex curvature with an outer radius r' extending from the inner space 21 to the outer surface 35. Also each side portion 24 comprises an outer surface 37 facing outwardly, away from the inner space 21 and having a concave curvature with an outer radius R' extending from a position P outside the inner space 21 to the outer surface 37. It is to be noted that the outer radius R' must not extend from the same position P as the inner radius R. The outer radius R' of each of the side portions 24 is larger than, or significantly larger than, the outer radius r' of the corner portions 23.

The border line 23-24 between the corner portion 23 and the side portion 24 is located at an outer transition point in a cross-sectional plane, or outer transition line along the length L, at the outer surfaces 35, 37, where the outer radius r' of the corner portion 23 is transferred to the outer radius R' of the side portion 24. As can be seen in FIGS. 4 and 5, there is no discontinuity at this outer transition point where the border line 23-24 intersects the outer surfaces 35, 37. In other words, a tangent of the outer surface 35 of the corner portion 23, in said cross-sectional plane, and a tangent of the outer surface 37 of the side portion 24, in said cross-sectional plane, are parallel and coincide with each other at the outer transition point.

Each of the side portions 24 of the barrel 2 has a first wall thickness $T_1$ at least at the centre part 28 of the side portion 24 along length L, or the whole length L, of the barrel 2. Each of the corner portions 23 has a second wall thickness $T_2$ at least at the centre part 26 of the corner portion 23 along the length L, or the whole length L, of the barrel 2. As can be seen in FIGS. 4 and 5, the first wall thickness $T_1$ is smaller than the second wall thickness $T_2$. Preferably, the ratio of the first wall thickness $T_1$ to the second wall thickness $T_2$ may lie in the range 0.3 to 0.7. More preferably, the ratio of the first wall thickness $T_1$ to the second wall thickness $T_2$ may be approximately 0.5.

Figure 6:
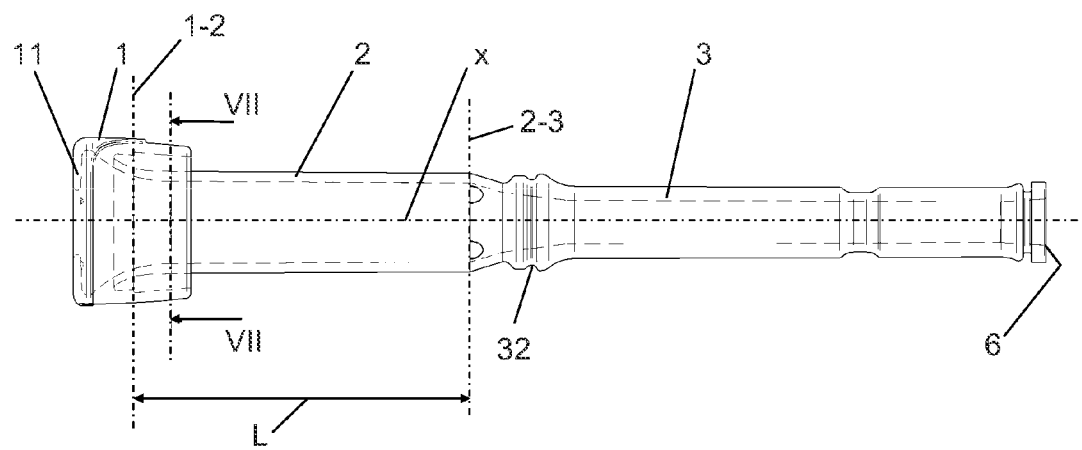
FIG. 6 discloses a longitudinal side view of a second embodiment of a teatcup liner according to the invention.
Figure 7:
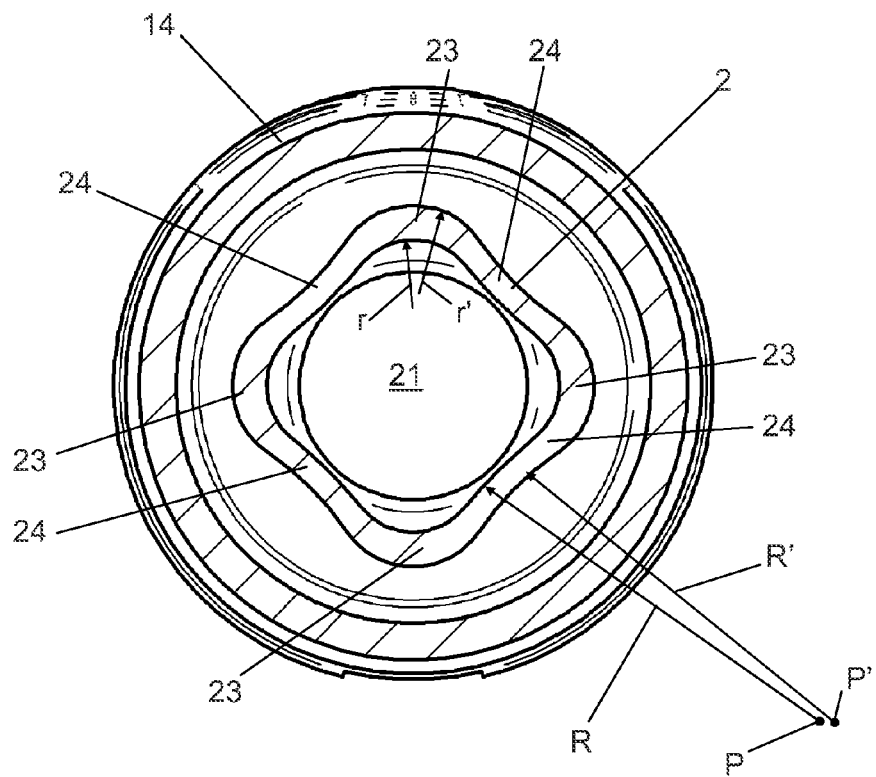
FIG. 7 discloses a sectional view of the teatcup liner along the line VII-VII in FIG. 6.

It is to be noted that the barrel 2 may have a polygonal cross-sectional shape with another number of corner portions 23 and side portions 24 than disclosed in the first embodiment. FIGS. 6 and 7 disclose a second embodiment, which differs from the first embodiment only in that the barrel 2 has a polygonal cross-sectional shape with four corner portions 23 and four side portions 24.

Also a cross-sectional shape with five corner portions 23 and five side portions 24 (not disclosed in the drawings) may be possible.

FIGS. 8-11 disclose a third embodiment of the teatcup liner. It is to be noted that elements having the same or corresponding functions in the embodiments disclosed have been given the same reference signs. In the third embodiment, the outlet portion 3 comprises or is designed as a nipple configured to permit connection of the outlet portion 3 and the barrel 2 to a separate short milk conduit 31 (not disclosed in FIGS. 8-11).

Furthermore, in the third embodiment the head 1, which comprises the lip 11 forming the opening 12 for the teat, is separate from the barrel 2. The head 1 may be permanently attached to the barrel 2 or detachably attached to the barrel 2. The barrel 2 has the same configuration as the barrel 2 in the first and second embodiments with three, four or possibly five corner portions 23 and three, four or possibly five side portions 24. Such a separate head 1 permits use of different materials, or materials having different properties, e.g. with respect to the elasticity, for the barrel 2 and the head 1 or the lip 11.

It is to be noted that the outlet portion 3 of the third embodiment may be combined with the first and second embodiments, or alternatively that the separate head portion may be combined with the first and second embodiments.

The present invention is not limited to the embodiments disclosed but may be varied and modified within the scope of the following claims.

The invention claimed is:

1. A teatcup liner configured to be mounted in a shell (4) of a teatcup to be applied to a teat of an animal during a milking operation, and having a longitudinal shape extending along a longitudinal axis (x), the teatcup liner comprising:
a barrel (2) having a length (L) along the longitudinal axis (x) and defining an inner space (21) for receiving the teat,
wherein the barrel (2), in a rest state, has an inner barrel surface with a polygonal cross-sectional shape transversely to the longitudinal axis (x) along an entirety of the length (L) that defines the inner space (21) that receives the teat, the polygonal cross-sectional shape defining a plurality of corner portions (23) and a plurality of side portions (24), each side portion (24) connecting two of said corner portions (23),
wherein, each of the side portions (24) has a first wall thickness ($T_1$) at least at a center part (28) of the side portion (24) along the length (L) of the barrel (2), each of the corner portions (23) has a second wall thickness ($T_2$) at least at the center part (26) of the corner portion (23) along the length (L) of the barrel (2), and the first wall thickness ($T_1$) is smaller than the second wall thickness ($T_2$),
wherein each corner portion (23) comprises an inner surface (25) with a concave curvature facing the inner space (21) and having an inner radius (r) extending from the inner space (21) to the inner surface (25),
wherein the inner radius (r) is equal for each corner portion (23) and the inner radius (r) of each of the corner portions (23) in the rest state is at least 4 mm at a center part (26) of the corner portion (23) such that the teat, when located within the polygonal cross-sectional shape, fills up the inner space during whole pulsation cycles during the milking operation, and
wherein the first wall thickness of the side portions is in a range of 1 to 2.6 mm, and the second wall thickness of the corner portions is in a range of 2.3 to 6 mm.

2. The teatcup liner according to claim 1,
wherein each corner portion (23) comprises an outer surface (35) facing away from the inner space (21) and having an outer radius (r') extending from the inner space (21) to the outer surface (35),
wherein each side portion (24) comprises an outer surface (37) facing away from the inner space (21) and having an outer radius (R') extending from a position outside the inner space (21) to the outer surface (37), and
wherein a border line (23-24) between the corner portion (23) and the side portion (24) is located at an outer transition point, at which a tangent of the outer surface (35) of the corner portion (23) and a tangent of the outer surface (27) of the side portion (24) coincide with each other.

3. The teatcup liner according claim 1, wherein the barrel (2), in the rest state, has an approximately triangular cross-sectional shape transversely to the longitudinal axis along the length (L) from the head (1) to the outlet portion (3), the cross-sectional shape thereby defining three corner portions (23) and three side portions (24) each connecting two of said corner portions (23).

4. The teatcup liner according to claim 1, wherein the teatcup liner also comprises, along the longitudinal axis (x), a head (1) comprising a lip (11) and an opening (12) for the teat, and an outlet portion (3), and wherein the barrel (2) extends along the length (L) from the head (1) to the outlet portion (3), and
wherein, where the teat is located within the polygonal cross-sectional shape filling up the inner space during the whole pulsation cycles during the milking operation, the barrel is free of empty space between the teat and the inner surface of the teatcup liner during the entire milking operation including when the teatcup liner is collapsed.

5. The teatcup liner according to claim 4, wherein the head (1) is an integrated part of the teatcup liner.

6. The teatcup liner according to claim 1, wherein the polygonal cross-sectional shape defines exactly four corner portions (23) and exactly four side portions (24).

7. A teatcup liner configured to be mounted in a shell (4) of a teatcup to be applied to a teat of an animal during a milking operation, and having a longitudinal shape extending along a longitudinal axis (x), the teatcup liner comprising:
a barrel (2) having a length (L) along the longitudinal axis (x) and defining an inner space (21) for receiving the teat,
wherein the barrel (2), in a rest state, has a polygonal cross-sectional shape transversely to the longitudinal axis (x), the polygonal cross-sectional shape defining a plurality of corner portions (23) and a plurality of side portions (24), each side portion (24) connecting two of said corner portions (23),
wherein each corner portion (23) comprises an inner surface (25) with a concave curvature facing the inner space (21) and having an inner radius (r) extending from the inner space (21) to the inner surface (25),
wherein the inner radius (r) is equal for each corner portion (23) and the inner radius (r) of each of the corner portions (23) in the rest state is at least 4 mm at a center part (26) of the corner portion (23) such that the teat, when located within the polygonal cross-sectional shape, fills up the inner space during whole pulsation cycles during the milking operation,
wherein each of the side portions (24), in the rest state, has a convex curvature towards the longitudinal axis (x), and
wherein the first wall thickness of the side portions is in a range of 1 to 2.6 mm, and the second wall thickness of the corner portions is in a range of 2.3 to 6 mm.

8. The teatcup liner according to claim 7, wherein each of the side portions (24), in the rest state, has the convex curvature towards the longitudinal axis (x) along substantially a whole length (L) of the barrel (2).

9. The teatcup liner according to claim 7,
wherein each side portion (24) comprises an inner surface (27) with the convex curvature facing the inner space (21) and having an inner radius (R) extending from a position (P) outside the inner space (21) to the inner surface (27), and
wherein the inner radius (R) of each of the side portions (24), in the rest state, is at least 20 mm and at most 60 mm at a center part (28) of the side portion (24).

10. The teatcup liner according to claim 9, wherein the inner radius (R) of each of the side portions (24) in the rest state is at least 30 mm and at most 50 mm at the center part (28) of the side portion (24).

11. The teatcup liner according to claim 7, wherein,
each of the side portions (24) has a first wall thickness ($T_1$) at least at a center part (28) of the side portion (24) along the length (L) of the barrel (2),
each of the corner portions (23) has a second wall thickness ($T_2$) at least at the center part (26) of the corner portion (23) along the length (L) of the barrel (2), and
the first wall thickness ($T_2$) is smaller than the second wall thickness ($T_2$).

12. The teacup liner according to claim 11, wherein the ratio of the first wall thickness ($T_1$) to the second wall thickness ($T_2$) lies in the range 0.3 mm to 0.7 mm.

13. The teacup liner according to claim 10, wherein the ratio of the first wall thickness ($T_1$) to the second wall thickness ($T_2$) is approximately 0.5 mm.

14. The teacup liner according to claim 7, further comprising a head (1) and an outlet portion (3),
wherein the barrel (2) is tapering along the length (L) from the head (1) to the outlet portion (3), and
wherein, where the teat is located within the polygonal cross-sectional shape filling up the inner space during the whole pulsation cycles during the milking operation, the barrel is free of empty space between the teat and the inner surface of the teatcup liner during the entire milking operation including when the teatcup liner is collapsed.

15. The teacup liner according to claim 7, wherein the polygonal cross-sectional shape defines exactly three corner portions (23) and exactly three side portions (24).

16. The teacup liner according to claim 7, wherein the polygonal cross-sectional shape defines exactly four corner portions (23) and exactly four side portions (24).

17. A teatcup liner configured to be mounted in a shell (4) of a teatcup to be applied to a teat of an animal during a milking operation, and having a longitudinal shape extending along a longitudinal axis (x), the teatcup liner comprising:
a barrel (2) having a length (L) along the longitudinal axis (x) and defining an inner space (21) for receiving the teat,
wherein the barrel (2), in a rest state, has an barrel inner surface with a polygonal cross-sectional shape transversely to the longitudinal axis (x) along an entirety of the length (L) that defines the inner space (21) that receives the teat, the polygonal cross-sectional shape defining a plurality of corner portions (23) and a plurality of side portions (24), each side portion (24) connecting two of said corner portions (23),
wherein, each of the side portions (24) has a first wall thickness ($T_1$) at least at a center part (28) of the side portion (24) along the length (L) of the barrel (2), each of the corner portions (23) has a second wall thickness ($T_2$) at least at the center part (26) of the corner portion (23) along the length (L) of the barrel (2), and the first wall thickness ($T_1$) is smaller than the second wall thickness ($T_2$),
wherein each corner portion (23) comprises a concave inner surface (25) facing the inner space (21), and when the teat is located within the polygonal cross-sectional shape, the teat fills up the inner space (21) during whole pulsation cycles during the milking operation, and
wherein the ratio of the first wall thickness ($T_1$) to the second wall thickness ($T_2$) lies in the range 0.3 mm to 0.7 mm.

18. The teacup liner according to claim 17, wherein the ratio of the first wall thickness ($T_1$) to the second wall thickness ($T_2$) is approximately 0.5 mm.

19. The teacup liner according to claim 17, wherein the first wall thickness ($T_1$) of the side portions is in a range of 1 to 2.6 mm, and the second wall thickness ($T_2$) of the corner portions is in a range of 2.3 to 6 MM.

20. The teacup liner according to claim 17, wherein the inner surface (25) of each corner portion (23) has an inner radius (r) extending from the inner space (21) to the inner surface (25), the inner radius (r) being equal for each corner portion (23), and the inner radius (r) of each of the corner portions (23) in the rest state being at least 4 mm at a center part (26) of the corner portion (23).

* * * * *